(12) United States Patent
Shinnaka et al.

(10) Patent No.: US 10,604,958 B2
(45) Date of Patent: Mar. 31, 2020

(54) STORAGE FACILITY FOR OBJECT OF PAYING OF RESPECTS

(71) Applicant: Daifuku Co., Ltd., Osaka-shi (JP)

(72) Inventors: Hidenobu Shinnaka, Tokyo (JP); Haruhito Furuya, Tokyo (JP); Wataru Kiyokawa, Tokyo (JP); Hideki Sato, Tokyo (JP); Yukinori Kameda, Tokyo (JP); Kazuya Arima, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/925,952

(22) Filed: Mar. 20, 2018

(65) Prior Publication Data

US 2018/0274259 A1    Sep. 27, 2018

(30) Foreign Application Priority Data

Mar. 22, 2017 (JP) ................................. 2017-055645

(51) Int. Cl.
*E04H 13/00* (2006.01)
*B65G 1/06* (2006.01)
(Continued)

(52) U.S. Cl.
CPC ............. *E04H 13/006* (2013.01); *B65G 1/06* (2013.01); *B65G 1/137* (2013.01); *B65G 13/04* (2013.01);
(Continued)

(58) Field of Classification Search
CPC ...... E04H 13/006; B65G 1/137; B65G 13/04; B65G 1/06; B65G 1/0435; E06B 9/24; E06B 2009/2464
See application file for complete search history.

(56) References Cited

U.S. PATENT DOCUMENTS 4,688,359 A * 8/1987 See .................. A61G 17/08
                                                52/104
4,739,595 A * 4/1988 Yamagata ............... E04H 13/00
                                                312/33
(Continued)

FOREIGN PATENT DOCUMENTS

JP         9108055 A     4/1997
JP         9137637 A     5/1997
(Continued)

OTHER PUBLICATIONS

Machine translation of the specification of the foreign patent is attached.*

*Primary Examiner* — Joshua K Ihezie

(74) *Attorney, Agent, or Firm* — The Webb Law Firm

(57) ABSTRACT

An opening for allowing an object of paying of respects to be moved therethrough is formed in a wall. An inside support position for an object of paying of respects to be supported at is set at a position that is in the internal area and across from the opening and in a range over which the transport device is capable of moving an object of paying of respects. A support portion configured to support an object of paying of respects is also configured to be moved, through the opening, between the inside support position and an outside support position for an object of paying of respects to be supported at such that at least a portion of the object of paying of respects is located outside the internal area.

10 Claims, 5 Drawing Sheets

(51) Int. Cl.
  *B65G 13/04* (2006.01)
  *B65G 1/137* (2006.01)
  *B65G 1/04* (2006.01)
  *E06B 9/24* (2006.01)

(52) U.S. Cl.
  CPC .............. *B65G 1/0435* (2013.01); *E06B 9/24* (2013.01); *E06B 2009/2464* (2013.01)

(56) References Cited

U.S. PATENT DOCUMENTS

| | | | | |
|---|---|---|---|---|
| 4,862,655 A * | 9/1989 | LePage | ................. | E04H 13/005 52/136 |
| 5,195,812 A * | 3/1993 | Eickhof | .............. | A47B 47/0091 312/257.1 |
| 5,477,594 A * | 12/1995 | LePage | ................. | E04H 13/006 211/194 |
| 7,926,228 B1 * | 4/2011 | Snow | .................... | E04H 13/008 27/35 |
| 2008/0116772 A1 * | 5/2008 | Champagne | ............ | A47F 3/005 312/117 |
| 2010/0139060 A1 * | 6/2010 | Leeder | ................. | E04H 13/008 27/1 |
| 2011/0014018 A1 * | 1/2011 | van Ooyen | .......... | B65G 1/0435 414/280 |
| 2011/0044792 A1 * | 2/2011 | Talley | .................. | B65G 1/0407 414/807 |
| 2013/0019544 A1 * | 1/2013 | Ng | .......................... | E04H 13/00 52/133 |
| 2013/0086779 A1 * | 4/2013 | Florea | .................... | A61G 17/08 27/1 |
| 2013/0199111 A1 * | 8/2013 | Eickhof | ................ | E04H 13/006 52/134 |
| 2013/0332563 A1 * | 12/2013 | Yuen | ...................... | G06Q 99/00 709/217 |
| 2014/0069775 A1 * | 3/2014 | Ueda | .................... | B65G 1/0421 198/470.1 |
| 2014/0182096 A1 * | 7/2014 | Jairala, Jr. | .............. | A61G 17/08 27/1 |
| 2015/0052830 A1 * | 2/2015 | School | .................. | E04H 13/006 52/134 |
| 2015/0252583 A1 * | 9/2015 | Dvorak | ................. | E04H 13/006 52/103 |
| 2016/0293468 A1 * | 10/2016 | Morikawa | ......... | H01L 21/67769 |
| 2017/0211291 A1 * | 7/2017 | Eickhof | ................. | A61G 17/08 |
| 2017/0313512 A1 * | 11/2017 | Miyagawa | ........... | B65G 1/0492 |
| 2018/0209164 A1 * | 7/2018 | Rossi | .................... | E04H 13/006 |

FOREIGN PATENT DOCUMENTS

| | | | |
|---|---|---|---|
| JP | 2001020561 A | * | 1/2001 |
| JP | 2005240539 A | | 9/2005 |

* cited by examiner

STORAGE FACILITY FOR OBJECT OF PAYING OF RESPECTS

CROSS-REFERENCE TO RELATED APPLICATION

This application claims priority to Japanese Patent Application No. 2017-055645 filed Mar. 22, 2017, the disclosure of which is hereby incorporated in its entirety by reference.

FIELD OF THE INVENTION

The present invention relates to a storage facility for objects of paying respects comprising a plurality of storage sections each configured to store an object of paying of respects, a respects-paying area which includes an area for a person, visiting to pay respects, to pay respects, a transport device configured to transport an object of paying of respects between any of the plurality of storage sections and the respects-paying area, a wall which defines an internal area by the wall alone or in combination with one or more other walls, the internal area being an area in which the plurality of storage sections and the transport device are located.

BACKGROUND ART

An example of a storage facility for object of paying of respects is described in JP Publication of Application No. H09-108055 (Patent Document 1). The storage facility for object of paying of respects described in Patent Document 1 is a three-dimensional altar device in which containers (10), each holding a mortuary tablet, or a funerary urn, etc., are the objects of paying of respects. The facility includes a plurality of storage rooms (23) for storing the containers (10), a chapel portion (27) where a person visiting to pay respects pays respects, a transport device (30) for transporting a container (10) between a storage room (23) and the chapel portion (27), and outer walls (40) which enclose the internal area where the plurality of storage rooms (23) and the transport devices (30) are located. And when a person visits to pay respects, a desired container (10) is taken out from a storage room (23), and is transported to the chapel portion (27) by the transport device (30).

SUMMARY OF THE INVENTION

Incidentally, in a storage facility for object of paying of respects such as one described above, when storing the objects of paying of respects for the first time in the storage sections (storage rooms), the objects of paying of respects are taken into the internal area where the storage sections are located from the area outside thereof (external area). In addition, when performing a certain task on an object of paying of respects located in the internal area (for example, inserting an object to be held (such as an urn) in a container into the container (with the container being an object of paying of respects), as the first object or an additional object to be held by the container), the object of paying of respects is taken out from the internal area to the external area. And an object of paying of respects may be taken into or out of the internal area in the presence of the family members of the deceased etc. in a religious ceremony for, for example, placing an urn into a grave; thus, manual operation required to take an object of paying of respects out of and into the internal area and performed by a priest or family members of the deceased should preferably be performed with relative ease to facilitate the performing of the operation in a manner that conveys solemnness. In addition, generally speaking, objects of paying of respects are taken out of and into the internal area less often than the frequency with which people visit such facility to pay respects. Thus, from a view point of making good use of the space outside the wall which defines the internal area by the wall alone or in combination with one or more other walls (e.g. of using the space for something else when not used to take an object of paying respects into or out of the internal area) or from a viewpoint of aesthetics, it is also desirable to keep small the amount of space outside the wall that is usually occupied by the structure required to take an object of paying respects out of and into the internal area. However, there is no statement in Patent Document 1 about taking objects of paying of respects into or out of the internal area.

Thus, a storage facility for objects of paying of respects is desired in which manual operation required to take an object of paying of respects out of and into the internal area can be performed with relative ease while keeping small the amount of space outside the wall that is usually occupied by the structure required to take an object of paying respects out of and into the internal area.

A storage facility for objects of paying of respects in accordance with the present disclosure comprises: a plurality of storage sections each configured to store an object of paying of respects; a respects-paying area which includes an area for a person, visiting to pay respects, to pay respects; a transport device configured to transport an object of paying of respects between any of the plurality of storage sections and the respects-paying area; a wall which defines an internal area by the wall alone or in combination with one or more other walls, the internal area being an area in which the plurality of storage sections and the transport device are located; wherein an opening for allowing an object of paying of respects to be moved therethrough is formed in the wall, wherein an inside support position for an object of paying of respects to be supported at is set at a position that is in the internal area and across from the opening and in a range over which the transport device is capable of moving an object of paying of respects, and wherein a support portion configured to support an object of paying of respects is also configured to be moved, through the opening, between the inside support position and an outside support position for an object of paying of respects to be supported at such that at least a portion of the object of paying of respects is located outside the internal area.

With the arrangement described above, an opening for allowing an object of paying of respects to be moved therethrough is formed in the wall which defines the internal area by the wall alone or in combination with one or more other walls. Thus, when taking an object of paying of respects out of or into the internal area, the object of paying of respects can be moved between the internal area and an area outside (external area) through the opening. And, with the arrangement described above, the support portion configured to support an object of paying of respects is also configured to be moved, through the opening, between the inside support position and the outside support position. Thus, the object of paying of respects can be moved through the opening with the object of paying of respects supported by the support portion. That is, it is not necessary for a person to support the object of paying of respects as it is moved or passed through the opening; so, the manual operation required to take an object of paying of respects out of and into the internal area can be more easily performed compared with a case in which it is necessary for a person to support the object of paying of respects as it is moved or passed through the opening.

In addition, with the arrangement described above, since the support portion can be kept at the inside support position except when an object of paying of respects is taken out of or into the internal area. Thus, the amount of space outside the wall that is usually occupied by a structure required to take an object of paying respects out of and into the internal area can be kept small.

Thus, with the arrangement described above, manual operation required to take an object of paying of respects out of and into the internal area can be performed with relative ease while keeping small the amount of space outside the wall that is usually occupied by a structure required to take an object of paying respects out of and into the internal area.

DETAILED DESCRIPTION OF EMBODIMENTS

Figure 1:
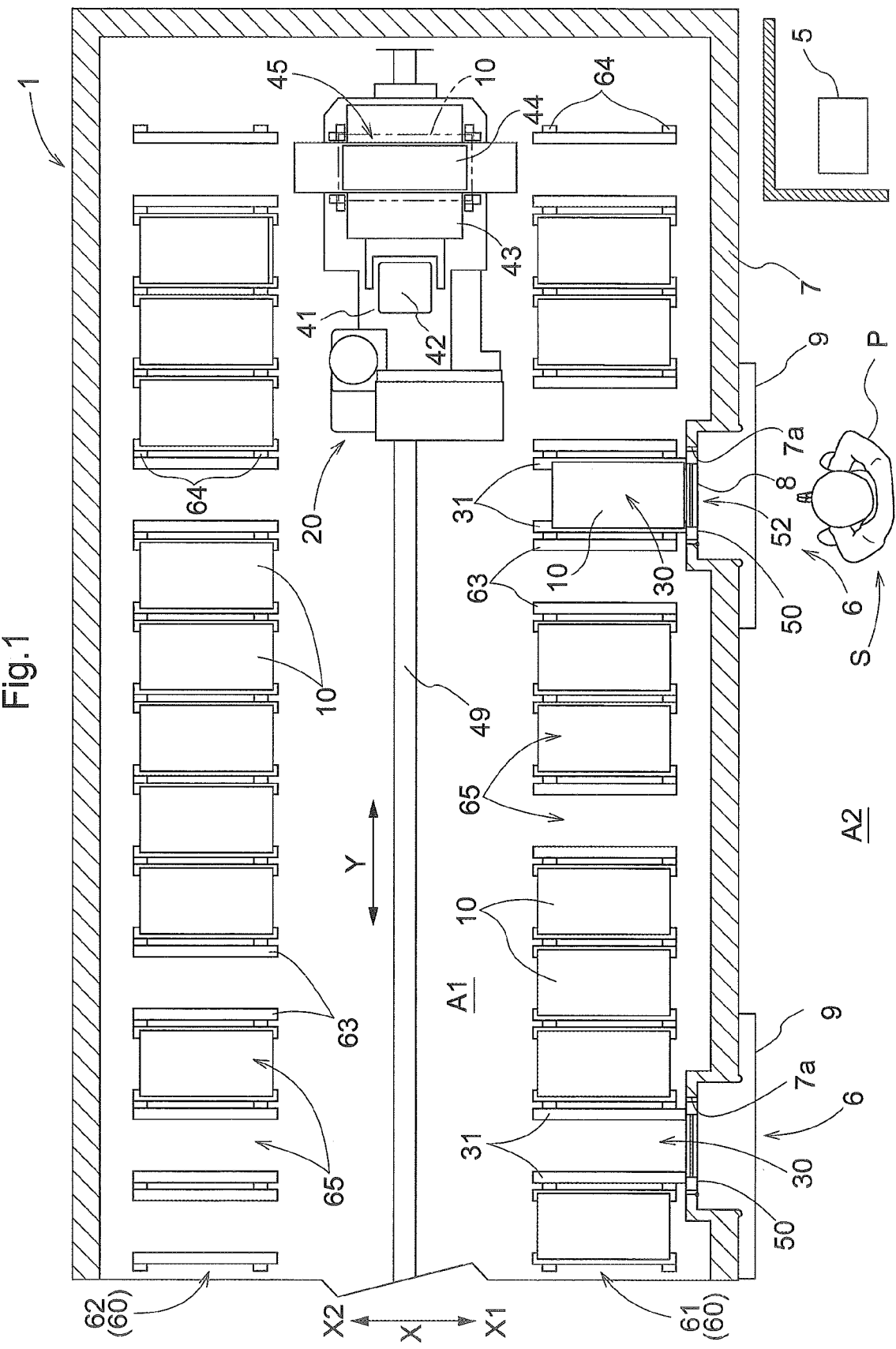
FIG. 1 is a plan view of a storage facility for objects of paying of respects.
Figure 2:
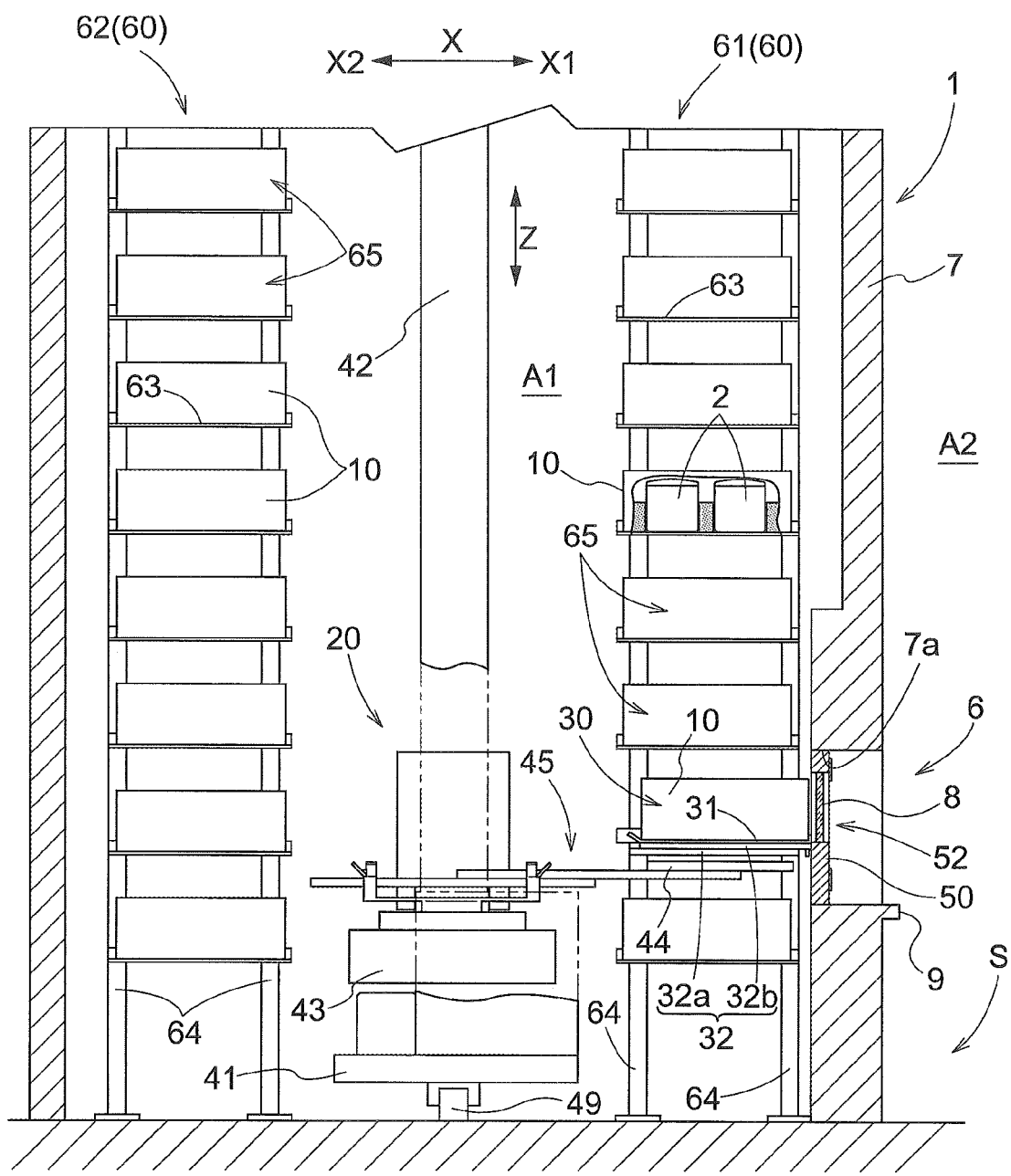
FIG. 2 is a side view of the storage facility for objects of paying of respects.

Embodiments of a storage facility for object of paying of respects are described with reference to the attached drawings. As shown in FIGS. 1 and 2, a storage facility for object of paying of respects (referred to hereinafter simply as the storage facility 1) is a facility which includes a plurality of storage sections 65 each for storing an "object 10 of paying of respects", respects-paying areas 6 each of which includes an area for a person P (visiting to pay respects) to pay respects, a transport device 20 which transports an object 10 of paying of respects between a storage section 65 and a respects-paying area 6 (more specifically, an inside support position 30 provided in a respects-paying area 6), and walls 7 that define the internal area A1 (in which the plurality of storage sections 65 and the transport device 20 are located). That is, the storage facility 1 is a facility which people visit to pay respects. Note that, as can be understood from the description below, each respects-paying area 6 also includes an area for an object of paying of respects which includes an area surrounding an object of paying of respects when such object is in a support position described below, thus, the respects-paying area 6 includes an area intended for a person visiting to pay respects to be oriented toward when paying respects. As such, the respects-paying area 6 includes a respects-paying portion which includes a support portion described below as well as a portion that can provide an area for a person (visiting to pay respects) to pay respects, among other things that may be described to be provided in the respects-paying area. The storage facility 1 includes a controller 5 (see FIG. 1) configured to control operation of the transport device 20. And when commanded by the controller 5, the transport device 20 transports an object 10 of paying of respects (that the person P visiting to pay respects intends to see) from a storage section 65 to the respects-paying area 6 and also transports the object 10 of paying of respects from the respects paying area 6 to a storage section 65 after the person finishes the paying of respects.

As shown in FIG. 2 in which a portion of a side surface of one object 10 of paying of respects is removed to show its inside, an object 10 of paying of respects is a container (a container for religious purposes) for holding, or configured to hold, a funerary urn containing a deceased's cremated remains, and is generally formed in a box shape (or in a shape of a rectangular parallelepiped in the present example) which forms a space for accommodating one or more objects 2 held within the container (housed objects 2 for short). A funerary urn, as a housed object 2, may contain cremated remains such as cremated pieces of bone of a deceased person or pet (referred to hereinafter simply as "cremated remains"). The housed object 2 can also be a container other than a funerary urn, such as a bag containing cremated remains. In addition, a housed object 2 (or object or material contained in a housed object 2) may be something other than cremated pieces of bone and may be ashes of the deceased person or pet (referred to hereinafter simply as "ashes"), a manufactured object containing cremated pieces of bone and/or ashes (for example, a mortuary tablet, a religious statue such as that of Buddha, etc.), a manufactured object containing no cremated pieces of bone or ashes (for example, a mortuary tablet, a religious statue, such as, that of Buddha, Christ or Mary, etc.), or an article which is left by, or reminds of, the deceased or pet, etc., or any combination thereof.

As shown in FIGS. 1 and 2, the walls 7 are formed to extend along the vertical direction Z, and are so located to surround the side perimeter (perimeter as seen along the vertical direction) of the internal area A1. In the following description, the area outside the walls 7 (areas on the opposite side of the walls 7 from the internal area A1) will be referred to as the external area A2. Openings 7a for allowing an object 10 of paying of respects to be passed or moved through (i.e., each opening 7a is larger than an object 10 of paying of respects as seen along the first direction X which is parallel to the horizontal plane) are formed in a wall 7 which defines the internal area in combination with other walls in the present embodiment, but alternatively may be a wall that defines the internal area by itself or in combination with one other wall.

Each inside support position 30 for an object 10 of paying of respects to be supported at is provided, or defined (i.e., set) at a position in the internal area A1 and across from the corresponding opening 7a and in a range over which the transport device 20 is capable of moving an object 10 of paying of respects. As described below, when taking (retrieving and storing) an object 10 of paying of respects out of and into the internal area A1, the object 10 of paying of respects is moved between the internal area A1 and the external area A2 through one of the openings 7a.

Figure 4:
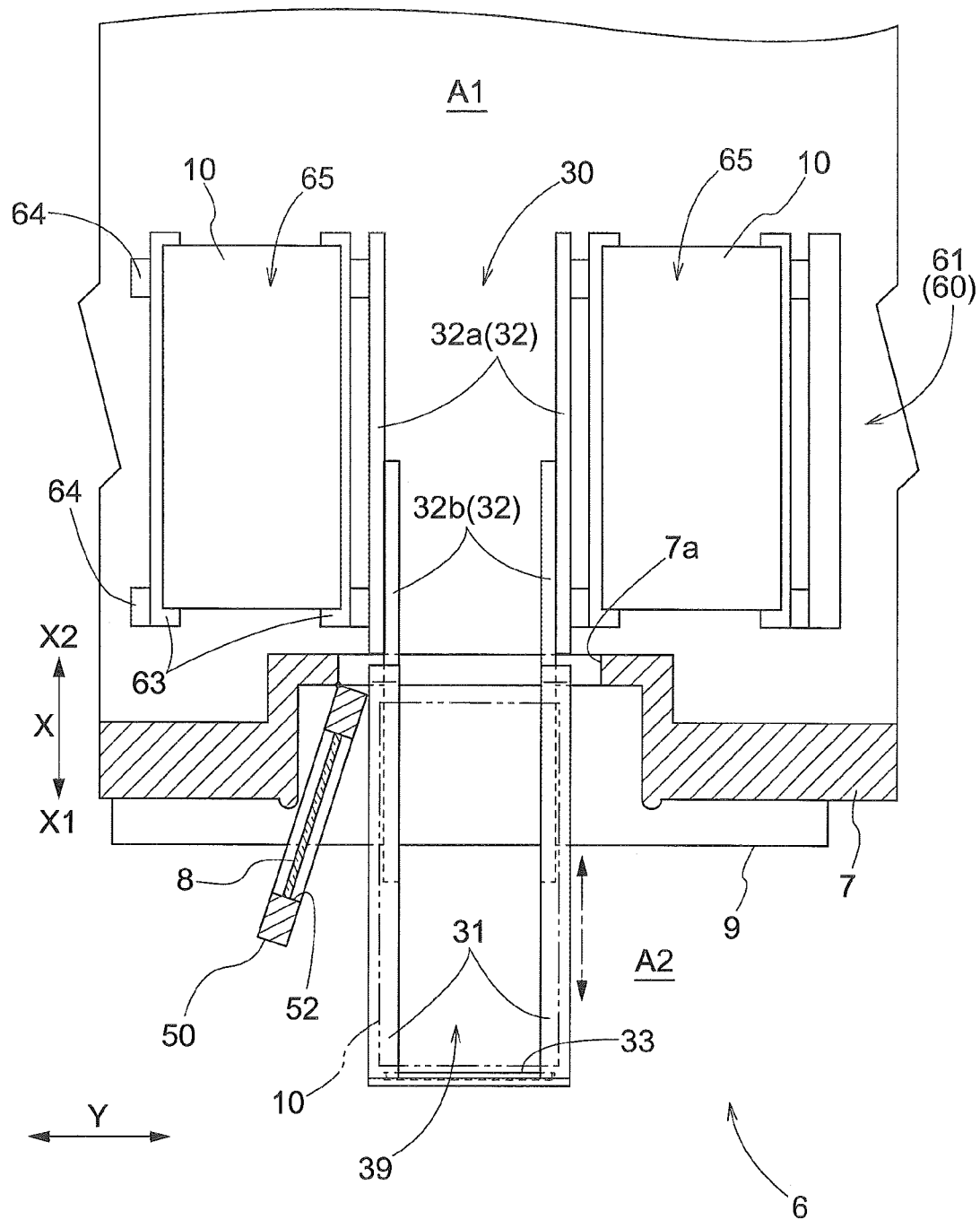
FIG. 4 is a plan view of an area of a respects-paying area of the storage facility for objects of paying of respects.

A door 50 which can close and leave open the corresponding opening 7a is provided for the corresponding opening 7a (i.e., provided so as to be capable of closing the opening 7a). The door 50 is formed in a shape that allows it to close the opening 7a in its closed state or position. Note that the door 50 may also be configured to close only a portion of the opening 7a in its closed state. In addition, the door 50 may be any type of door, such as a hinged door, a sliding door, a folding door, etc., and may include a plurality of door bodies as in the case of a double door that opens outward. As shown in FIG. 4, each door 50 is a hinged door with one door body in the present embodiment. And each door 50 is pivotable about a pivot axis which extends along the vertical direction Z and which is located along a vertical edge on one side along a second direction Y and next to the opening 7a, with the second direction Y being a direction parallel to the horizontal plane and perpendicular to the first direction X. Each door 50 is configured to be manually switched between an open state and a closed state (i.e., manually opened and closed). And while not shown, each door 50 is provided with a grip or a handle for gripping when opening or closing the door. Without going into detail, a mechanism that provides force to assist the opening and/or closing the door 50 (e.g., a mechanism that uses an urging force of a spring, etc.) may also be provided. In addition, the opening and/or closing of the door 50 may be automatically performed (i.e., performed by a mechanism) based on a manual operation (such as an actuation of a switch), through a use of an urging force of a spring, or of actuating force from a source of such force (e.g., electric motor etc.), among other possibilities.

As shown in FIGS. 1 and 2, a portion or a part of a wall 7 is located in the corresponding respects-paying area 6. The wall 7 is so located to partition off an inside support position 30 from a respects-paying position S which is a position for a person P (visiting to pay respects) to pay respects (i.e., to divide an neighboring area into an area in which the respects-paying position S is located and an area in which the inside support position 30 is located), with the division being located at a set position along the first direction X. That is, each inside support position 30 is provided or located in the corresponding respects-paying area 6. And the opening 7a located across from an inside support position 30 along the first direction X is formed in a portion (of the wall 7) that is located in the respects-paying area 6. In the following description, a side along the first direction X on which the opening 7a (or the door 50) is located with respect to the inside support position 30 is referred to as the first side X1 while the side opposite from the first side X1 is referred to as the second side X2 along the first direction X.

The door 50 provided in the corresponding opening 7a has a window 52 (including an opening through which the object 10 of paying respects can be viewed). The window 52 is provided in an area or a portion of the door 50, and more specifically in an area or a portion (of the door 50 in its closed state) toward which the object 10 of paying of respects supported at the inside support position 30 faces along the first direction X so that a person P visiting to pay respects can view the object 10 of paying of respects. Therefore, when a person P visiting to pay respects, they can view the object 10 of paying of respects supported in the inside support position 30 through the window 52. Thus, the inside support position 30 is also a support position at which an object 10 of paying of respects is supported in the corresponding respects-paying area 6 when a person P visiting to pay respects pays respects. Without going into detail, information related to a housed object 2 is carved, printed, etc., on an end surface (alternatively, on a plate-shaped member attached to such end surface) of an object 10 of paying of respects. And an object 10 of paying of respects is brought to and placed at an inside support position 30 such that such end surface faces toward, and is located close to, the window 52. Note that examples of the information related to the housed object 2 include the deceased's family name, the deceased's family crest or symbol, the deceased's favorite words or saying, and is expressed by a set of characters, one or more designed figures, one or more symbols, or a combination thereof.

Figure 3:
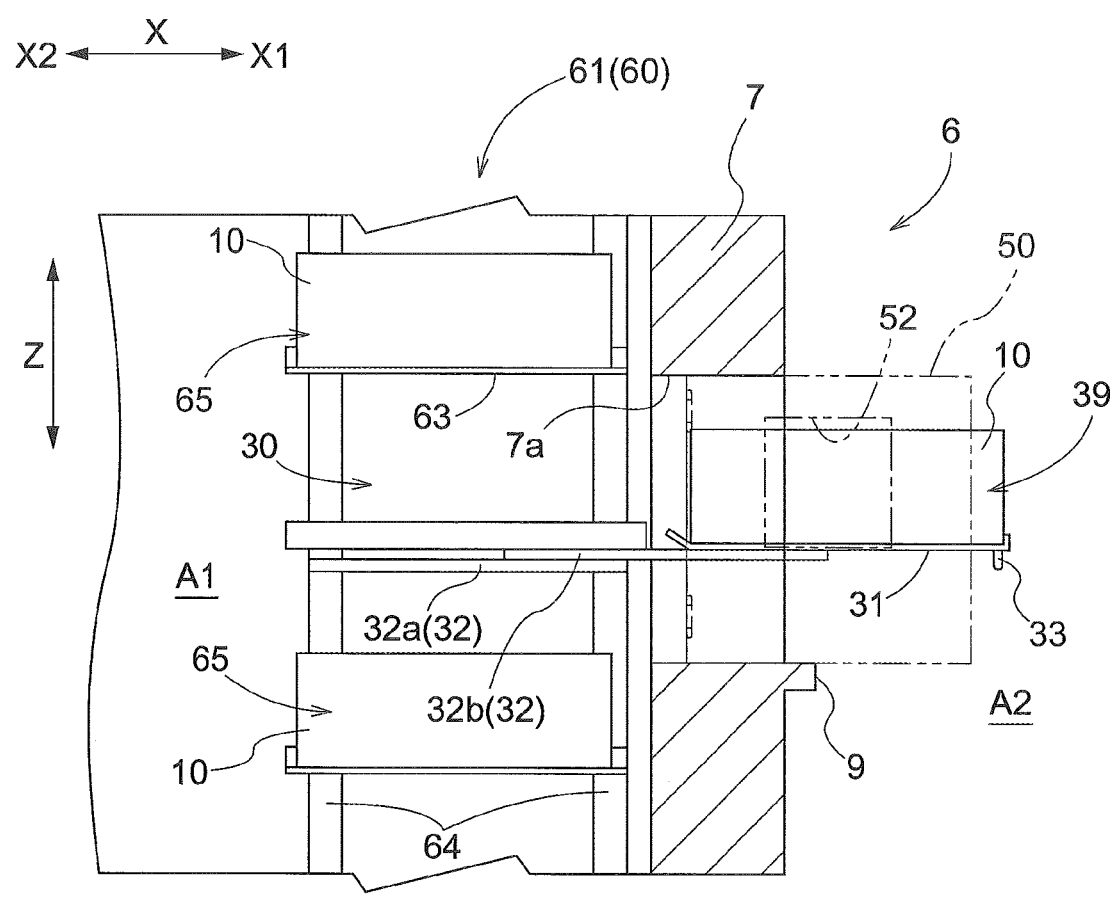
FIG. 3 is a side view of an area of a respects-paying area of the storage facility for objects of paying of respects.

The window 52 is formed to correspond in shape and dimensions to those of the end surface described above, and is rectangular in shape in the present embodiment as shown in FIG. 3. As shown in FIGS. 1, 2, and 4, a window member 8 is located in the corresponding window 52. And the window member 8 is formed to have a shape of a rectangular flat plate (i.e., the outline of the flat plate is rectangular in shape) that is so dimensioned to fit into the window 52 with the plate being generally flat and thin (thickness is less than its length and width). A clear glass plate, or a glass with variable opacity which can be changed between a transparent state and a non-transparent state by changing the supply of electric energy may be used as the window member 8. An altar 9 on which incense sticks, an offering, etc., may be placed is formed in a portion of a wall 7 that forms the lower edge of the opening 7a. In addition, a gravestone pattern (for example, a granite pattern or design that imitates a gravestone surface) is applied to, attached to, or otherwise placed on, an outer surface of the wall 7 (the surface that faces the first side X1) around the opening 7a. The same pattern may be placed on or provided to the outer surface of the portion of each door 50 excluding the area of the window 52.

As shown in FIGS. 1 and 2, each storage rack 60 is formed with a plurality of storage sections 65 located in the same position along the first direction X. The plurality of storage sections 65 which form each storage rack 60 are arranged in a plurality of vertical rows with one vertical row located next to another along the second direction Y and in a plurality of horizontal rows with one horizontal row located above another along the vertical direction Z. In other words, each storage rack 60 is so oriented that a rack depth or thickness direction is parallel to the first direction X whereas a rack lateral direction is parallel to the second direction Y. Each storage rack 60 includes a plurality of support columns 64 extending along the vertical direction Z, and a plurality of support arms 63 (each of which includes a generally-plate-shaped member) extending along the first direction X. Each support arm 63 is fixed to each of a pair of support columns 64 that are adjacent each other along the first direction X. The storage sections 65 are divided into individual sections by the support columns 64 along the second direction Y and by the support arms 63 along the vertical direction Z. As shown in FIG. 1, each object 10 of paying of respects is stored in a storage section 65 with the object 10 being supported by a pair of support arms 63 that are spaced apart from each other along the second direction Y. Each storage section 65 is configured to store one object 10 of paying of respects. A pair of storage racks 60 are provided such that they face each other along the first direction X. In the following description, one of the storage racks 60 of the pair that is located on the first side X1 will be referred to as the first storage rack 61 whereas the other of the storage racks 60 of the pair that is on the second side X2 will be referred to as the second storage rack 62.

As shown in FIGS. 1 and 2, each internal support position 30 is provided, or defined (i.e. set), in place of one or more storage sections 65 in the first storage rack 61. More specifically, in the first storage rack 61, a plurality of unit spaces each for forming one storage section 65 (with each unit space being defined by adjacent support arms 63 and adjacent support columns 64) are arranged in a plurality of horizontal rows with one horizontal row located above another along the vertical direction Z and in a plurality of vertical rows with one vertical row located next to another along the second direction Y. Some of these unit spaces are used instead to define the inside support positions 30. As shown in FIGS. 1 and 2, for each inside support position 30, a pair of receiving support members 31 are provided in place of a pair of support arms 63. And an object 10 of paying of respects can be supported from below by a pair of receiving support members 31 that are located to be spaced apart, and adjacent, along the second direction Y, from each other. As with each support arm 63, each receiving support member 31 includes a generally-plate-shaped (generally flat and thin) member positioned to extend along the first direction X with a flat support surface (for supporting an object 10 of paying of respects from below) formed in the top portion of the generally-plate-shaped member. Thus, the receiving support members 31 for supporting an object 10 of paying of respects from below are provided for each inside support position 30 and separately from the transport device 20. And an object 10 of paying of respects transported to an inside support position 30 by the transport device 20 is placed on the receiving support members 31.

As shown in FIGS. 1 and 2, the transport device 20 is a stacker crane. More specifically, the transport device 20 includes a travel member 41 configured to travel while being guided by a rail 49 installed on a floor surface, a mast 42 arranged vertically on the travel member 41, a vertically movable member 43 which can be raised and lowered (or movable along the vertical direction Z) while being guided by the mast 42, and a transfer device 45 supported by the vertically movable member 43. The controller 5 controls the operation of the transport device 20 (more specifically, traveling operation of the travel member 41, vertical movement operation of the vertically movable member 43, and transfer operation of the transfer device 45) based on detected information from various sensors (for example, rotary encoder, etc.).

The controller 5 includes a processor such as a microcomputer, and a peripheral circuit such as a memory. And each function of the controller 5 is performed through collaboration between such hardware and one or more computer programs executed by hardware, such as a processor. The controller 5 may be provided to the transport device 20, or may be provided separately from the transport device 20. In addition, when the controller 5 includes a plurality of pieces or parts of hardware that are separated from each other in a way that they can communicated with each other, one or more pieces or parts of hardware may be provided to the transport device 20 while the remaining pieces or parts of hardware may be provided separately from the transport device 20.

The transfer device 45 is a device configured to transfer an object 10 of paying of respects between a support portion (lower-end support portion 44 described below) of the transport device 20 for supporting an object 10 of paying of respects and a support portion (e.g., a pair of support arms 63 or a pair of receiving support members 31 in the present example) of a transfer target (a storage section 65 or a support position 30) for supporting an object 10 of paying of respects. The transfer device 45 includes a slide-out mechanism configured to project and retract the lower-end support portion 44 configured to support from below an object 10 of paying of respects along, i.e., parallel to, the first direction X. And the slide-out mechanism 44 projects and retracts the lower-end support portion 44 along the first direction X between a retracted position (position of the lower-end support portion 44 shown in FIG. 1) in which the lower-end support portion 44 is retracted (i.e., is in a retracted state) toward the vertically movable member 43 and a projected position (position of the lower-end support portion 44 shown in FIG. 2) in which the lower-end support portion 44 is projected (i.e., is in a projected state) relative to this retracted position toward the transfer target location. The width of the lower end support portion 44 along the second direction Y is less than the distance, along the second direction Y, between the support arms 63 forming a pair and the distance between the receiving support members 31 forming a pair. This slide-out mechanism is configured to be capable of moving the lower-end support portion 44 to a projected position located on one side with respect to the retracted position along the first direction X and also to a projected position located on the opposite side with respect to the retracted position along the first direction X.

A transfer operation of an object 10 of paying of respects from the lower-end support portion 44 to a storage section 65 by the transfer device 45 is described next. Firstly, the transport device 20 moves the lower-end support portion 44 (in a retracted position with an object 10 of paying of respects supported thereon) to an upper target position set for, and with respect to, the storage section 65, that is the transfer target, through a traveling operation of the travel member 41 and the vertical movement operation of the vertically movable member 43. Next, the transport device 20 moves the lower-end support portion 44 from the retracted position to the projected position by means of the slide-out mechanism. When the storage section 65 that is the transfer target is a storage section 65 in the first storage rack 61, then the lower-end support portion 44 is moved toward the first side X1 to the projected position on the first side X1 with respect to the retracted position whereas, when the storage section 65 that is the transfer target is a storage section 65 in the second storage rack 62, then the lower-end support portion 44 is moved toward the second side X2 to the projected position on the second side X2 with respect to the retracted position. Subsequently, the transport device 20 lowers the lower-end support portion 44 to unload the object 10 of paying of respects onto the storage section 65 through vertical movement operation of the vertically movable member 43, after which, the lower-end support portion 44 is moved to the retracted position from the projected position by the slide-out mechanism of the transfer device 45.

A detailed description of a transfer operation by the transfer device 45 of an object 10 of paying of respects from the lower-end support portion 44 to a pair of receiving support members 31 is omitted here since this operation is identical to the transfer operation of the object 10 of paying of respects from the lower-end support portion 44 to a storage section 65 of the first storage rack 61 as described above, except for the fact that the upper target position in the description above is replaced by an upper target position for the pair of receiving support members 31. Note that, as shown in FIG. 2, the position at which an object 10 of paying of respects is supported at an inside support position 30 is displaced or shifted toward the first side X1 relative to the position at which an object 10 of paying of respects is supported in a storage section 65 of the first storage rack 61; thus, the projected position for transferring an object 10 of paying of respects to a pair of receiving support members 31 is set to be located more toward the first side X1 than the projected position for transferring an object 10 of paying of respects to a storage section 65 of the first storage rack 61.

A transfer operation of the object 10 of paying of respects from a storage section 65 to the lower-end support portion 44 by the transfer device 45 is described next. Firstly, the transport device 20 moves the lower-end support portion 44 in the retracted position to a lower target position set or defined for, and with respect to, the storage section 65 (which is the transfer target) through a traveling operation of the travel member 41 and a vertical movement operation of the vertically movable member 43. Next, the transport device 20 moves the lower-end support portion 44 from the retracted position to the projected position by means of the slide-out mechanism, and subsequently, raises the lower-end support portion 44 through a vertical movement operation of the vertically movable member 43 to pick up an object 10 of paying of respects from the storage section 65 with the lower-end support portion 44, and then, causes the lower-end support portion 44 to be moved from the projected position to the retracted position by means of the slide-out mechanism. The projected position referred to here is either the projected position on the first side X1 or the projected position on the second side X2 with respect to the retracted position, depending on whether the storage section 65 that is the transfer target is one in the first storage rack 61 or the second storage rack 62, as was the case of the transfer operation of the object 10 of paying of respects from the first support member 44a to a storage section 65 by the transfer device 45. In addition, with regard to the upper target position and the lower target position set or defined for any of the storage section 65, the lower target position is set to be at the same position along the second direction Y as the upper target position, and is set to be lower along the vertical direction Z than the upper target position by a set distance.

A detailed description of a transfer operation by the transfer device 45 of an object 10 of paying of respects from a pair of receiving support members 31 to the lower-end support portion 44 is omitted here since this operation is identical to the transfer operation of the object 10 of paying of respects from a storage section 65 of the first storage rack 61 to the lower-end support portion 44 as described above, except for the fact that the lower target position in the description above is replaced by a lower target position for the pair of receiving support members 31. In addition, with regard to the upper target position and the lower target position set or defined for a pair of receiving support members 31, the lower target position is set to be at the same position along the second direction Y as the upper target position, and is set to be lower along the vertical direction Z than the upper target position by a set distance.

Incidentally, the openings 7a are formed in the wall 7 as described above, an object 10 of paying of respects can be moved between the internal area A1 and the external area A2 by uncovering an opening 7a by opening the corresponding door 50 (by moving it to its open state) as shown in FIGS. 3 and 4. For example, when storing an object 10 of paying of respects in a storage section 65 for the first time, the object 10 of paying of respects can be taken into the storage section 65 in the internal area A1 from the external area A2 by moving the object 10 of paying of respects to an inside support position 30 in the internal area A1 from the external area A2 through an opening 7a and then by moving the object 10 of paying of respects from the inside support position 30 to the storage section 65 through a transport operation by the transport device 20. In addition, when performing a certain task on an object 10 of paying of respects stored in a storage section 65 (for example, inserting an object (to be held in a container) into the container, as the first object or an additional object to be held by the container), the object 10 of paying of respects can be taken or carried out from the storage section 65 and to the external area A2 by moving the object of paying of respects from the storage section 65 to an inside support position 30 through a transporting operation by the transport device 20 and then by moving the object 10 of paying of respects from the inside support position 30 to the external area A2 through the opening 7a. Next, an arrangement for facilitating the manual operation required to take an object of paying of respects out of and into the internal area A1 is described.

As described above, each inside support position 30 is provided or defined at a position in the internal area A1 that is located across from the opening 7a along the first direction X. And each pair of receiving support members 31 provided at the corresponding inside support position 30 for supporting an object of paying of respects can be moved, or projected and retracted, between the inside support position 30 and an outside support position 39 through the opening 7a. Each opening 7a is formed to have such dimensions as to allow the corresponding pair of receiving support members 31 with an object 10 of paying of respects supported thereon to be moved, or passed, through the opening 7a along the first direction X. Each inside support position 30 is a position for supporting an object 10 of paying of respects such that the entirety of the object 10 of paying of respects is located within the internal area A1, as shown in FIG. 2 while each outside support position 39 is a position for supporting an object 10 of paying of respects such that at least a portion or a part of an object 10 of paying of respects is located outside the internal area A1 (i.e., located in the external area A2), as shown in FIGS. 3 and 4. With the location of the boundary between the internal area A1 and the external area A2 in the corresponding respects-paying area 6 being a position of the opening 7a, and as indicated by the object 10 of paying of respects (shown in FIG. 4 with long-dashed double short-dashed lines) that is supported at the outside support position 39, the entirety of the object 10 of paying of respects is located in the external area A2 (i.e., outside the opening 7a) when located at the outside support position 39 in the present embodiment. In the present embodiment, a pair of receiving support members 31 forms, or correspond to, a "support portion".

Guiding supporting portions 32 configured to guide and support the corresponding receiving support members 31 to allow the receiving support members 31 to be moved (i.e. for movement) between the inside support position 30 and the outside support positions 39 are provided in positions set with respect to the corresponding opening 7a. That is, the positioning of the guiding supporting portions 32 is set to correspond to the position of the corresponding opening 7a, and is set such that the guiding supporting portions 32 overlap with the opening 7a as seen along the first direction X in the present embodiment. A pair of receiving support members 31 are provided for each inside support position 30 such that the receiving support members 31 of the pair are spaced apart from each other along the second direction Y. And a guiding supporting portion 32 is provided to each of the receiving support member 31 of the pair.

To describe the structure of the guiding supporting portions 32 more specifically, each guiding supporting portion 32 includes a second guide portion 32b which supports the corresponding receiving support member 31 such that the receiving support member 31 can slide, or is movable smoothly, along the first direction X, and a first guide portion 32a which supports the second guide portion 32b such that the second guide portion 32b can slide, or is movable smoothly, along the first direction X. Each first guide portion 32a is fixedly provided and, more specifically, is fixed to each of support columns 64 that form a pair and are spaced apart from each other along the first direction X. As shown in FIG. 2, when the receiving support members 31 forming a pair are located at the inside support position 30, the entirety of each receiving support member 31 as well as the entirety of each of the guiding supporting portions 32 (both the first guide portion 32a and the second guide portion 32b) are located on the second side X2 of, or with respect to, the opening 7a and the door 50. From this state, the receiving support members 31 forming a pair are moved to the outside support position 39 as shown in FIG. 3 by moving the second guide portions 32b toward the first side X1 with respect to the first guide portions 32a and moving the receiving support members 31 toward the first side X1 with respect to the second guide portions 32b. When the receiving support members 31 are located at the outside support position 39, at least a portion (of each of the receiving support members 31) that is on the first side X1 is located on the first side X1 of, or with respect to, the opening 7a. In addition, from the state in which the receiving support members 31 are located in the outside support position 39, the receiving support members 31 forming a pair are moved to the inside support position 30 as shown in FIG. 2 by moving the second guide portions 32b toward the second side X2 with respect to the first guide portions 32a and moving the receiving support members 31 toward the second side X2 with respect to the second guide portions 32b. Note that the arrangement and structures of the guiding supporting portions 32 may be changed suitably. For example, among other possibilities, an arrangement may be adopted in which first guide portions 32a support the receiving support members 31 such that the receiving support members 31 can slide, or are movable smoothly, along the first direction X, without providing the second guide portions 32b. Or an arrangement may be adopted in which one or more additional guide portions are interposed between each second guide portion 32b and the corresponding receiving support member 31.

The receiving support members 31 forming a pair are configured to be manually moved (i.e., moved by human power) between the inside support position 30 and the outside support position 39. More specifically, as shown in FIGS. 3 and 4, a handle 33 for manually pulling out the receiving support members 31 is provided to a connecting portion which connects the first side X1 end portions of the receiving support members 31 of the pair. And the receiving support members 31 can be moved from the inside support position 30 to the outside support position 39 by gripping the handle 33 and pulling out the receiving support member 31. In addition, the receiving support members 31 can be moved from the outside support position 39 to the inside support position 30 by pushing on the handle 33 or any other portion. The handle 33 is located below the top surfaces of the receiving support members 31 so that it does not interfere, or come into contact, with the object 10 of paying of respects supported by the receiving support members 31. Note that at least a portion of the handle 33 may have any one of various shapes (e.g., a convex shape (with the diameter increasing toward the center), a concave shape (with the diameter decreasing toward the center), a flat-plate shape (i.e., flat and thin), a cylindrical or rod shape, a shape with one or more through holes and/or grooves, etc.) and may have any of various structures, such as leg portions, known to be used in a handle. Without going into detail, a mechanisms that provides force to assist in moving the receiving support members 31 (e.g., a mechanism that uses an urging force of a spring, etc.) may also be provided. In addition, one or both of the projecting movement of the receiving support members 31 from the inside support position 30 to the outside support position 39 and the retracting movement of the receiving support members 31 from the outside support position 39 to the inside support position 30 may be automatically performed (i.e., performed by a mechanism) based on a manual operation (such as an actuation of a switch), through a use of an urging force of a spring, or of actuating force from a source of such force (e.g., electric motor etc.), among other possibilities.

As shown in FIG. 3, the handle 33 is positioned such that it does not jut out, or project, to the first side X1, with respect to the receiving support member 31 (i.e., the handle 33 in its entirety is located on the second side X2 of, or with respect to, the first side X1 ends of the receiving support members 31). This arrangement allows an object 10 of paying of respects, when supported by the receiving support members 31 located in the inside support position 30, to be located closer to the door 50 along the first direction X compared with a case in which the handle 33 juts out to the first side X1 with respect to the receiving support member 31. By so positioning or placing an object 10 of paying of respects close to the door 50 along the first direction X when supported by the receiving support members 31, the visibility of the object 10 of paying of respects as seen by a person P visiting to pay respects can be improved and the visual effects (designed to convey solemnness and a quality of luxury, etc.) in a respects-paying area 6 can be improved.

Because each pair of receiving support members 31 is configured to be capable of being moved, or projected and retracted, between an inside support position 30 and an outside support position 39, an object 10 of paying of respects can be moved, or passed, through the corresponding opening 7a with the receiving support members 31 supporting the object 10 of paying of respects, when taking the object 10 of paying of respects out of and into the internal area A1. That is, the loading and unloading of an object 10 of paying of respects onto and from the receiving support members 31 located in the outside support position 39 are performed by a person by supporting the object 10 of paying of respects. However, it is not necessary to manually support the object 10 of paying of respects when moving the object 10 of paying of respects between an inside support position 30 and an outside support position 39 through the corresponding opening 7a. Thus, the manual operation required in the process of taking an object 10 of paying of respects out of and into the internal area A1 (more specifically, work required to move the object 10 of paying of respects between the external area A2 and the inside support position 30) is made easier to perform compared with a case in which it is necessary for a person to support the object 10 of paying of respects while moving it through the opening 7a. And, as a result, when taking an object of paying of respects out of and into the internal area A1 in the presence of the family members of the deceased etc. in a religious ceremony for, for example, placing an urn into a grave, the arrangement above helps facilitate the performing of this operation by a priest or a family member in a manner that conveys solemnness.

In addition, a housed object 2 (one or more objects or material to be placed in, or already in, the object 10 of paying of respects) may need be placed in or removed from an object 10 of paying of respects on the occasion of taking the object 10 of paying of respects out of the internal area A1. By having an arrangement that allows the receiving support members 31 to be moved, or projected and retracted, between the inside support position 30 and the outside support position 39, the housed object 2 can be placed in or removed from an object 10 of paying of respects while the object 10 of paying of respects is supported by the receiving support members 31 located at the outside support position 39. In other words, a housed object 2 may be placed in or removed from an object 10 of paying of respects while at least a portion of an object 10 of paying of respects (the entire object 10 of paying of respects in the present embodiment) is located outside the opening 7a (i.e. located on the opposite side of the opening 7a from the internal area A1). From this perspective also, the manual operation during the process of taking an object 10 of paying of respects out of and into the internal area A1 (manual operation required in the taking the object 10 of paying of respects) can be made easier to perform.

In the present embodiment, each inside support position 30 is also a support position at which an object 10 of paying of respects is supported in the corresponding respects-paying area 6 when a person P (visiting to pay respects) pays respects. And it is possible to create a solemn atmosphere in a respects-paying area 6 when a person P (visiting to pay respects) pays respects in the respects-paying area 6, by retracting or moving the receiving support member 31 to the inside support position 30 and closing the door 50. More specifically, by closing the door 50, the area in the internal area A1 that is visible to a person P visiting to pay respects can be limited to a relatively small area that depends on the size of the window 52 (i.e., limited to an area smaller than the visible area that depends on the area of the opening 7a). As a result, it is possible to create a solemn atmosphere for a person P visiting to pay respects by making it difficult for the person P visiting to pay respects to see things (such as the transport device 20) in the internal area A1 other than the object 10 of paying of respects supported by the receiving support members 31 located at the inside support position 30.

Without going into detail, a locking mechanism can be provided that can be switched between a movement allowing state and movement prohibiting state to prevent an unintentional (projecting or retracting) movement of the receiving support members 31. In addition, each pair of receiving support members 31 may be provided with: one or more restricting members for restricting movement of an object 10 of paying of respects with respect to the receiving support members 31; and/or one or more guide portions that come into contact with an object 10 of paying of respects when it is horizontally displaced from a set position on the receiving support members 31 to correct the position of the object 10 of paying of respects to the set position.

Other Embodiments

Other embodiments of a storage facility for objects of paying of respects are described next.

(1) In the embodiment described above, an example is described in which each inside support position 30 is also a support position at which an object 10 of paying of respects is supported in the corresponding respects-paying area 6 when a person P (visiting to pay respects) pays respects. However, the invention is not limited to such an arrangement. An inside support position 30 may be different from the support position at which an object 10 of paying of respects is supported when a person P pays respects. In this case, the arrangement may be such that the door 50 does not have a window 52, and/or that no door 50 is provided for the opening 7a which would then always be left open.

(2) In the embodiment described above, an example is described in which the closing and opening of the door 50 is performed independently of the projecting and retracting movement of the corresponding pair of receiving support members 31. However, the invention is not limited to such an arrangement. The arrangement may be such that the closing and opening of the door 50 is liked with the projecting and retracting movement (e.g., the projecting movement from the inside support position 30 to the outside support position 39 or the retracting movement from the outside support position 39 to the inside support position 30) of the corresponding pair of receiving support members 31. For example, the arrangement may be such that the opening of the door 50 is linked with the projecting movement of the receiving support members 31. Without going into detail, the mechanism that links or couples the closing and opening of the door 50 with the projecting and retracting movement of the corresponding pair of receiving support members 31 may, for example, be a linkage mechanism, a mechanism that uses a gear assembly, or a mechanism that makes use of gravity (for example, an arrangement in which the opening of the door 50 causes one or more members that prevent the receiving support members 31 from moving are moved out of the way to allow the receiving support members 31 to slide forward under the force of gravity), among other possibilities.

(3) In the embodiment described above, an example is described in which the support portion configured to be moved, or projected and retracted, through the opening 7a between the inside support position 30 and the outside support position 39 is formed by a pair of receiving support members 31 which are provided separately from the transport device 20 and which support an object 10 of paying of respects from below. However, the invention is not limited to such an arrangement. Instead, the support portion provided to the transport device 20 to support an object 10 of paying of respects may be arranged to be capable of being moved, or projected and retracted, through the opening 7a, between the inside support position 30 and the outside support position 39. If such arrangement is adopted in the embodiment described above, the lower-end support portion 44 would be, or correspond to, the "support portion" configured to be moved, or projected and retracted, through the opening 7a between the inside support position 30 and the outside support position 39. In such a case, when a person P (visiting to pay respects) pays respects, an object 10 of paying of respects that has been moved to the inside support position 30 by the lower-end support portion 44 would remain supported by the lower end support portion 44 at that position until the person P visiting to pay respects finishes paying respects. In addition, when taking an object 10 of paying of respects out of and into the internal area A1, the lower end support portion 44 is moved, or projected and retracted between the inside support position 30 and the outside support position 39, in addition to being moved between a storage section 65 and the inside support position 30.

Figure 5:
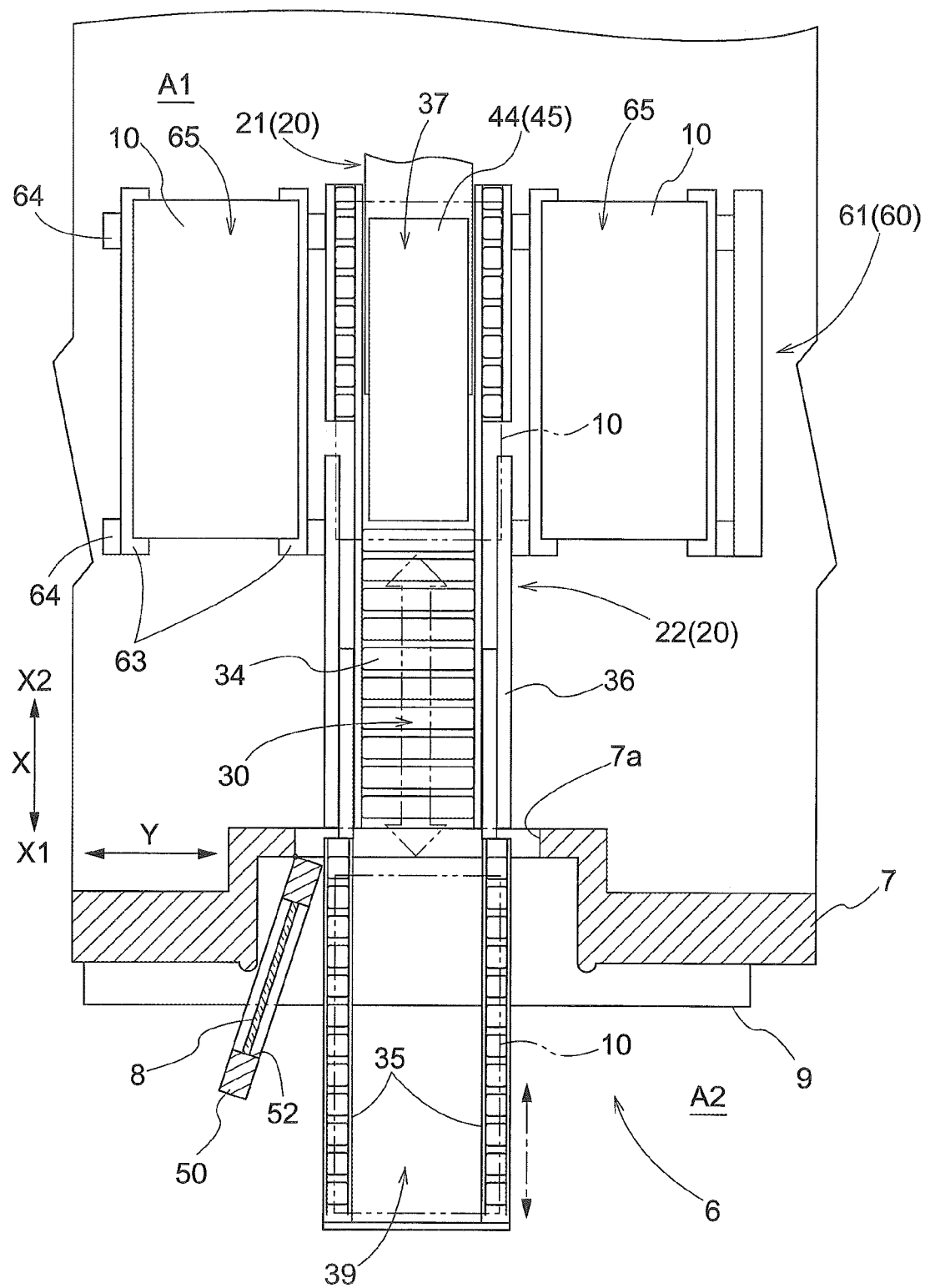
FIG. 5 is a plan view of an area of a respects-paying area of the storage facility for objects of paying of respects in accordance with another embodiment.

Alternatively, as in an example shown in FIG. 5, the arrangement may be such that, in addition to a first transport device 21 which corresponds to the transport device 20 in the embodiment described above, the transport device 20 includes a second transport device 22 which transports an object 10 of paying of respects between the first transport device 21 and an inside support position 30, and such that a support portion provided to the second transport device 22 to support an object 10 of paying of respects is configured to be capable of being moved, or projected and retracted, through the corresponding opening 7a between the inside support position 30 and the outside support positions 39. In the example shown in FIG. 5, the transporting path of the object 10 of paying of respects by the second transport device 22 is formed to extend along the first direction X with one end (second side X2 end portion) of the transporting path providing or defining a relay position 37 at which an object 10 of paying of respects is transferred between the first transport device 21 and the second transport device 22.

The second transport device 22 includes movable transport portions 35 which are capable of being moved, or projected and retracted, between the inside support position 30 and the outside support position 39 in addition to a fixed transport portion 34 whose position along the first direction X is fixed. One movable transport portion 35 is located on one side of the fixed transport portion 34 along the second direction Y while the other movable transport portion 35 is located on the other side of the fixed transport portion 34 along the second direction Y. And a plurality of driven rollers are provided in the fixed transport portion 34 and in each of the movable transport portions 35.

When moving an object 10 of paying of respects between the relay position 37 and the inside support position 30, both the driving rollers provided in each of the movable transport portions 35 and the driving rollers provided in the fixed transport portion 34 are actuated or driven with the movable transport portions 35 located at the inside support position 30. In addition, when moving an object 10 of paying of respects between the inside support position 30 and the outside support position 39, the movable transport portions 35 are moved or projected and retracted without actuating or driving the driven rollers provided in the movable transport portions 35 while the driven rollers provided in the fixed transport portion 34 are actuated or driven in synchronization with the projecting and retracting movement of the movable transport portions 35. In the example shown in FIG. 5, the movable transport portions 35 form, or correspond to, the "support portion" configured to be moved, or projected and retracted, through the opening 7a between the inside support position 30 and the outside support position 39. Note that in the example shown in FIG. 5, the second transport device 22 includes roller conveyors. However, the second transport device 22 may include transport mechanisms other than roller conveyors, such as belt conveyors and/or slat conveyors. In addition, the second transport device 22 may be a device whose transport surface (over the entire width along the second direction Y) can be extended or stretched and retracted or shrunk along the first direction X. And an arrangement may be such that the position of the first side X1 end portion of the transport surface is moved between the inside support position 30 and the outside support position 39. Also, in the example shown in FIG. 5, the driven rollers may be provided only in the fixed transport portion 34 (between the fixed transport portion 34 and the movable transport portions 35) so that the movable transport portions 35 are not provided with driven rollers but are provided only with freely rotatable rollers.

(4) In the embodiment described above, an example is described in which the entirety of the object 10 of paying of respects is located in the external area A2 (outside the opening 7a) when at the outside support position 39. However, the invention is not limited to such an arrangement. An arrangement may be adopted in which only a portion of an object 10 of paying of respects (only a first side X1 portion) is located in the external area A2 when at the outside support position 39.

(5) In the embodiment described above, an example is described in which the transfer device 45 includes a slide-out mechanism configured to project and retract the lower-end support portion 44 along, i.e., parallel to, the first direction X. However, the invention is not limited to such an arrangement. Among other possibilities, the arrangement may be such that the transfer device 45 includes a mechanism that projects and retracts along the first direction X a pair of clamps that can hold an object 10 of paying of respects from the both sides along the second direction Y, or may be such that the transfer device 45 includes a mechanism that projects and retracts along the first direction X a grip portion which grips a projection (flange portion, etc.) provided in an upper portion of an object 10 of paying of respects, or may be such that the transfer device 45 includes a mechanism that projects and retracts along the first direction X an engaging portion (one or more hooks) which can releasably engage one or more engaged portions (handles etc.) provided to a side face of each object 10 of paying of respects.

(6) In the embodiment described above, an example is described in which the transport device 20 is a stacker crane. However, the invention is not limited to such an arrangement. The transport device 20 may be a transport device other than a stacker crane, such as, among other possibilities, a ceiling or overhead transport vehicle capable of traveling along a travel rail (travel path) provided on a ceiling side to transport an article, or an article transport vehicle capable of traveling on a floor surface autonomously while recognizing or detecting its own current position. In addition, in the embodiment described above, an example arrangement is described in which the transport device 20 consists of a single transport device; however, the transport device 20 may include two or more transport devices each of which is capable of transferring an object 10 of paying of respects to another. For example, as with the example of FIG. 5 described above, the transport device 20 may include a first transport device 21 and a second transport device 22. When combining such arrangement with the receiving support members 31 of the embodiment described above, the second transport device 22 and the receiving support members 31 may be arranged to be capable of moving vertically relative to each other (i.e., such that one of the two can move to a higher position and lower position than the other) so that an object 10 of paying of respects can be transferred between the second transport device 22 and the receiving support members 31 at the inside support position 30.

(7) In the embodiment described above, an example is described in which an object 10 of paying of respects is a container (a container for religious purposes) which has a general outer shape of a rectangular parallelepiped. However, the invention is not limited to such an arrangement. Each object 10 of paying of respects may be a container which is for holding, or configured to hold, one or more housed objects 2 such as cremated remains or a funerary urn but which does not have a general outer shape of a rectangular parallelepiped. For example, an object 10 of paying of respects may be a container which is shaped to resemble a building for religious purposes, such as a temple, shrine, or cathedral, or may be a container which has an outer shape of an object of worship or prayer, such as, Christ, Buddha, a bodhisattva (e.g., Kshitigarbha, a guardian deity of children, etc.) or a religious saint or personage. In addition, a thing or material that is placed over a "housed object 2" from above (a thing or material that covers an object or material 2 from above and sides) is also considered to fall within the meaning of a container as used in the present specification. In addition, an object 10 of paying of respects does not have to be and may not be a container. For example, an object 10 of paying of respects may be a mortuary tablet, or a statue of Buddha, Christ or Mary, etc., as described above. Therefore, an object 10 of paying of respects may be an object (such as cremated remains or a funerary urn containing cremated remains, etc.) representing one (such as the deceased, etc.) being paid respects to, or may be a container for containing, or configured to contain, such object.

(8) In the embodiment described above, an example is described in which each storage section 65 is configured to store one object 10 of paying of respects. However, the invention is not limited to such an arrangement. The arrangement may be such that each storage section 65 stores a plurality of objects 10 of paying of respects (for example, two objects 10 of paying of respects) one placed next to another in the first direction X. In addition, in the embodiment described above, an example arrangement is described in which the storage facility 1 includes both the first storage rack 61 and the second storage rack 62; however, the arrangement may such that the storage facility 1 includes only one of the first storage rack 61 and the second storage rack 62.

(9) Note that an arrangement disclosed in any of the embodiments described above can also be used in combination with any arrangement disclosed in any other embodiment unless inconsistency arises. This applies to any combination of embodiments which are described as "other embodiments". Regarding any other arrangements and features, the embodiments disclosed in the present description are provided for the purposes of illustration only regarding all aspects. Therefore, it is possible to make various suitable changes without departing from the spirit of the present disclosure.

Summary of Embodiments Described Above

A brief summary of the storage facility for objects of paying of respects described above is provided next.

A storage facility for objects of paying of respects comprises: a plurality of storage sections each configured to store an object of paying of respects; a respects-paying area which includes an area for a person, visiting to pay respects, to pay respects; a transport device configured to transport an object of paying of respects between any of the plurality of storage sections and the respects-paying area; a wall which defines an internal area by the wall alone or in combination with one or more other walls, the internal area being an area in which the plurality of storage sections and the transport device are located; wherein an opening for allowing an object of paying of respects to be moved therethrough is formed in the wall, wherein an inside support position for an object of paying of respects to be supported at is set at a position that is in the internal area and across from the opening and in a range over which the transport device is capable of moving an object of paying of respects, and wherein a support portion configured to support an object of paying of respects is also configured to be moved, through the opening, between the inside support position and an outside support position for an object of paying of respects to be supported at such that at least a portion of the object of paying of respects is located outside the internal area.

With the arrangement described above, an opening for allowing an object of paying of respects to be moved therethrough is formed in the wall which defines the internal area by the wall alone or in combination with one or more other walls. Thus, when taking an object of paying of respects out of or into the internal area, the object of paying of respects can be moved between the internal area and an area outside (external area) through the opening. And, with the arrangement described above, the support portion configured to support an object of paying of respects is also configured to be moved, through the opening, between the inside support position and the outside support position. Thus, the object of paying of respects can be moved through the opening with the object of paying of respects supported by the support portion. That is, it is not necessary for a person to support the object of paying of respects as it is moved or passed through the opening; so, the manual operation required to take an object of paying of respects out of and into the internal area can be more easily performed compared with a case in which it is necessary for a person to support the object of paying of respects as it is moved or passed through the opening.

In addition, with the arrangement described above, since the support portion can be kept at the inside support position except when an object of paying of respects is taken out of or into the internal area. Thus, the amount of space outside the wall that is usually occupied by a structure required to take an object of paying respects out of and into the internal area can be kept small.

Thus, with the arrangement described above, manual operation required to take an object of paying of respects out of and into the internal area can be performed with relative ease while keeping small the amount of space outside the wall that is usually occupied by a structure required to take an object of paying respects out of and into the internal area.

Here, the wall is preferably located in the respects paying area to partition off the inside support position from a respects-paying position for a person visiting to pay respects in the respects-paying area, wherein a door capable of closing and leave open the opening is preferably provided for the opening, wherein the door preferably has a window, and wherein the window is preferably located in an area of the door toward which an object of paying of respects faces when supported at the inside support position, so as to allow a person visiting to pay respects to view the object of paying of respects when supported at the inside support position.

With the arrangement described above allows a person to pay respects and an object of paying of respect to be taken out of and into the internal area, in the respects-paying area. More specifically, when a person (visiting to pay respects) pays respects in the respects-paying area, the space occupied by the support portion when located at the outside support position can be used as a space for the person to pay respects by retracting or moving the support portion to the inside support position and closing the door. And by closing the door, the area in the internal area that is visible to a person visiting to pay respects can be limited to a relatively small area that depends on the size of the window (i.e., limited to an area smaller than the visible area that depends on the area of the opening). As a result, it is possible to create a solemn atmosphere for a person visiting to pay respects by making it difficult for the person visiting to pay respects to see things (such as the transport device, etc.) in the internal area other than the object of paying of respects located in the internal area. On the other hand, when taking an object of paying of respects out of or into the internal area, by opening the door and thereby allowing the support portion to be moved, or projected and retracted, through the opening, between the inside support position and the outside support position, the object of paying of respects can be properly moved, through the opening, between the inside support position and the outside support position, with the object of paying of respects supported by the support portion.

And, with the arrangement described above, the inside support position can also be a support position at which an object of paying of respects is supported when a person visiting to pay respects pays respects. Thus, various parts and members for supporting an object of paying of respects in the internal area as well as parts provided on the outside of the wall (an ornaments, and an altar, etc.) do not have to be provided separately for these positions, in contrast to a case in which the inside support position and the support position are located at different locations. This allows the cost of the facility as well as the installation space for the facility can be reduced.

Where a door is provided for the opening, an opening of the door is preferably linked with projecting movement of the support portion.

With the arrangement described above, the manual operation required to move the support portion from the inside support position to the outside support position can be made simpler compared with a case in which the opening of the door is not linked with the projecting movement of the support portion. Therefore, taking an object of paying of respects out of and into the internal area can be made even easier.

In s storage facility for object of paying of respects having at least one of the arrangements described above, the support portion is preferably provided separately from the transport device, and is preferably formed by one or more receiving support members configured to support an object of paying of respects from below, wherein one or more guiding supporting portions configured to guide and support the one or more receiving support members for movement between the inside support position and the outside support position are preferably provided at a position or positions set with respect to the opening.

With the arrangement described above, compared with a case in which a support portion for transporting provided in the transport device to support an object of paying of respects is used as the support portion that can be moved, or projected and retracted, between the inside support position and the outside support position, the functionality and capacity required of the transport device do not have to be so great because, and to the extent that, it is not necessary to move the support portion for transporting to the outside support position. This helps reduce the cost of the transport device. Note that, with the arrangement described above, it is necessary to provide one or more receiving support members as well as one or more guiding supporting portions separately from the transport device; however, it is necessary to provide these members and portions only in the location for taking an object of paying of respects out of and into the internal area. Thus, the cost of the entire facility can be reduced.

It is considered to be sufficient for the storage facility for object(s) of paying of respects in accordance with the disclosure to perform at least one of the results or effects described above.

What is claimed is:

1. A storage facility for objects of paying of respects comprising:
   a plurality of storage sections each configured to store an object of paying of respects;
   a respects-paying area which includes an area for a person, visiting to pay respects, to pay respects;
   a transport device configured to transport an object of paying of respects between any of the plurality of storage sections and the respects-paying area;
   a wall which defines an internal area by the wall alone or in combination with one or more other walls, the internal area being an area in which the plurality of storage sections and the transport device are located;
   wherein an opening for allowing an object of paying of respects to be moved therethrough is formed in the wall,
   wherein an inside support position for an object of paying of respects to be supported at is set at a position that is in the internal area and across from the opening and in a range over which the transport device is capable of moving an object of paying of respects,
   wherein a support portion configured to support an object of paying of respects is also configured to be moved, through the opening, between the inside support position and an outside support position for an object of paying of respects to be supported at such that at least a portion of the object of paying of respects is located outside the internal area,
   wherein one or more guiding supporting portions configured to guide and support the support portion for movement between the inside support position and the outside support position are provided at a position or positions set with respect to the opening,
   wherein the one or more guiding supporting portions include a fixed portion which is fixed at the position or positions set with respect to the opening, and a connecting portion which connects the fixed portion and the support portion,
   wherein when the support portion is located at the inside support position, the whole support portion and the whole one or more guiding supporting portions are located on a side of the internal area with respect to the opening; and wherein the support portion is provided with a handle for pulling out the support portion from the inside support position to the outside support position.

2. The storage facility for objects of paying of respects as defined in claim 1, wherein
   the wall is located in the respects paying area to partition off the inside support position from a respects-paying position for a person visiting to pay respects in the respects-paying area,
   wherein a door capable of closing and leaving open the opening is provided for the opening,
   wherein the door has a window, and
   wherein the window is located in an area of the door toward which an object of paying of respects faces when supported at the inside support position, so as to allow a person visiting to pay respects to view the object of paying of respects when supported at the inside support position.

3. The storage facility for objects of paying of respects as defined in claim 2, wherein
   an opening of the door is linked with projecting movement of the support portion.

4. The storage facility for objects of paying of respects as defined in claim 2, wherein
   an object of paying of respects is formed in a shape of a rectangular parallelepiped, and
   wherein the window is formed to correspond in shape and dimensions to those of an end surface of an object of paying of respects.

5. The storage facility for objects of paying of respects as defined in claim 1, wherein
   the support portion is provided separately from the transport device, and is formed by one or more receiving support members configured to support an object of paying of respects from below.

6. The storage facility for objects of paying of respects as defined in claim 1, wherein
   a door capable of closing and leaving open the opening is provided for the opening, and wherein when the support portion is located at the inside support position, the whole support portion is placed in the internal area with respect to the door in its closed state.

7. The storage facility for objects of paying of respects as defined in claim 1, wherein the plurality of storage sections are arranged in a plurality of vertical rows with one vertical row located next to another along a horizontal direction and in a plurality of horizontal rows with one horizontal row located above another along a vertical direction, and wherein the inside support position is provided in place of one of the plurality of storage sections.

8. The storage facility for objects of paying of respects as defined in claim 1, wherein the support portion is provided separately from the transport device, and is formed by one or more receiving support members configured to support an object of paying of respects from below, and wherein when the one or more receiving support members are located at the inside support position, an object of paying of respects is transferred between the transport device and the one or more receiving support members.

9. The storage facility for objects of paying of respects as defined in claim 1, wherein the support portion is provided to the transport device to support an object of paying of respects.

10. The storage facility for objects of paying of respects as defined in claim 1, wherein the plurality of storage sections are divided into individual sections along a horizontal direction by a plurality of support columns extending along a vertical direction, and wherein the fixed portion is fixed to a support column from among the plurality of support columns.

* * * * *